US00RE34777E

United States Patent [19]

Nielsen

[11] E Patent Number: Re. 34,777

[45] Reissued Date of Patent: Nov. 8, 1994

[54] TOOL RING, A METHOD OF MAKING IT, AND A HOLDING TOOL FOR USE IN THE PERFORMANCE OF THE METHOD

[75] Inventor: Ove Nielsen, Skanderborg, Denmark

[73] Assignee: Enkotec A/S, Skanderborg, Denmark

[21] Appl. No.: 125,300

[22] PCT Filed: Oct. 23, 1987

[86] PCT No.: PCT/DK87/00134

§ 371 Date: Jun. 22, 1990

§ 102(e) Date: Jun. 22, 1990

[87] PCT Pub. No.: WO89/03734

PCT Pub. Date: May 5, 1989

Related U.S. Patent Documents

Reissue of:

[64] Patent No.: 5,050,260
Issued: Sep. 24, 1991
Appl. No.: 473,996
Filed: Jun. 22, 1990

[30] Foreign Application Priority Data

Apr. 24, 1986 [NL] Netherlands ..... 1881/86

[51] Int. Cl.[5] ..... B21G 3/12

[52] U.S. Cl. ..... 470/129

[58] Field of Search ..... 72/91, 191, 195, 197, 72/198; 470/115, 129, 120

[56] References Cited

U.S. PATENT DOCUMENTS 358,553 3/1887 Hill .
364,119 5/1887 Lewis .
475,315 5/1892 Hirsch ..... 72/195
713,219 11/1902 Holt .
1,175,567 3/1916 Sleeper .
2,621,343 12/1952 Fray .
2,642,594 6/1953 Fray .
2,917,756 2/1959 Stearns .
2,929,301 3/1960 Stalbuth .
3,111,697 11/1963 Wilson .
3,165,765 1/1965 Wilson .
3,522,720 8/1970 Sendzimir .
3,585,665 6/1971 Jackson .
4,309,885 1/1982 Nielsen .

FOREIGN PATENT DOCUMENTS 143935 11/1981 Denmark .

OTHER PUBLICATIONS

Derwent's Abstract No.: 87-027715/04: SU-379-11-9-A: P52: 1987.

*Primary Examiner*—Lowell A. Larson
*Attorney, Agent, or Firm*—Ladas & Parry

[57] ABSTRACT

A tool ring (1) for securing blanks in a machine of the type comprising a pair of rotating rings whose opposite, plane side faces are formed with a plurality of holding tools (8, 11) so adapted that an oblong blank (16) can be secured substantially radially between a pair of holding tools in respective ones of said rings. At least one ring has a groove (4) which is adapted to receive holding tools and spacer tools (9, 10, 10', 12) of which at least the holding tools have a convex face (23, 33) to engage the engagement face (19) of said groove. The holding tools (8, 9, 11) are mutually spaced by the spacer tools, and some of the spacer tools (10, 12) are positioned in the groove, while the position of the spacer tools is defined by the cooperation between edge faces (24, 25, 30, 31) on the tools.

20 Claims, 4 Drawing Sheets

Figure 1:
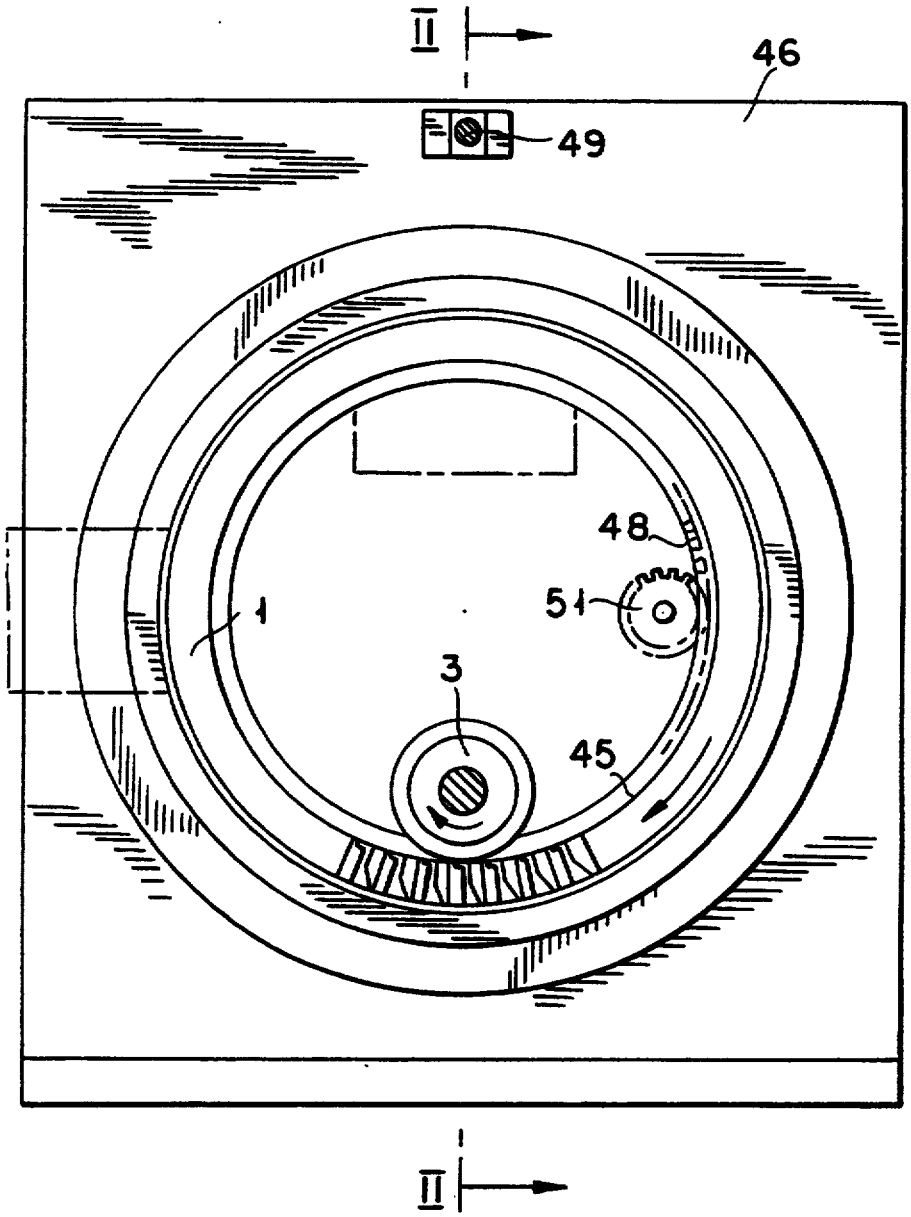

TOOL RING, A METHOD OF MAKING IT, AND A HOLDING TOOL FOR USE IN THE PERFORMANCE OF THE METHOD

Matter enclosed in heavy brackets [ ] appears in the original patent but forms no part of this reissue specification; matter printed in italics indicates the additions made by reissue.

The invention concerns a tool ring for securing blanks in a machine of the type comprising a pair of rotating rings whose opposite, plane side faces are formed with a plurality of holding tools so adapted that an oblong blank can be secured substantially radially between a pair of holding tools in respective ones of said rings. The Danish Patent Specification 143 [965] *935* discloses an example of such a machine.

The number of holding tool halves in each ring can typically be 20 to 40, and the holding tools have till now been mounted by shrinkage, each of the rings having been pre-formed with a plurality of axial cuts mating exactly with the holding tools. It will be appreciated that it is very expensive to manufacture the known tool rings because of the tolerance requirements, where particularly the radial distance of the cuts from the centre of the ring, which defines the radial position of the holding tools, is critical. The manufacturing costs are an extremely important aspect since, usually, the known tool rings have to be replaced completely if just one of the many holding tools or cuts in the ring is defective.

The object of the invention is to provide a tool ring of the above-mentioned type, which is considerably cheaper to manufacture and which can moreover be serviced at lower costs.

This object is achieved by a tool ring for securing blanks in a machine of the type comprising a pair of rotating rings. Opposite, plane side faces of the rings are formed with a plurality of holding tools and are so adapted that an oblong blank can be secured substantially radially between a pair of holding tools in respective ones of said rings and at least one ring has a groove adapted to receive the holding tools. Spacer tools are adapted to be fixed relative to the groove between the holding tools, each of said spacer tools and adjacent holding tools have cooperating wedge faces. One or more of the holding tools is secured between a pair of spacer tools, for forcing the holding tools into engagement with an engagement face of the groove, which face is disposed co-axially with the axis of the ring. When the mentioned groove is produced, the ring may e.g. be fixed in a ball bearing similar to the one holding the rings in the known machine, so as to permit, in a very inexpensive manner, a fine tolerance of the wall in the groove which defines the radial position of the tools.

It will be appreciated that this is far better than having to make about 20 to 40 cuts in each tool ring. The tool ring of the invention has the additional advantage that it is relatively easy to replace a defective holding tool as the fixed distance tools in the vicinity of the defective holding tool are just to be loosened to replace the holding tool.

In the preferred embodiment, the grooves in a set of tool rings are formed so that planes of the opposite rings form a small angle with each other, the bottom of the groove in one ring is parallel with the plane of the ring.

The bottom of the groove in the other ring forms an angle with a radius in said ring corresponding to said angle between the ring planes, which permits the use of uniform tools in the two rings.

It is of significant importance that at least every second spacer tool can be displaced to accommodate the manufacturing tolerances of the tools, so that not more than every second spacer tool can be positioned in the groove against movement lengthwise in it. At least some of the positioned spacer tools are secured preferably by means of screws, which can in principle fix the spacer tools in a radial or in an axial direction in the tool ring. An embodiment in which the spacer tools are fixed in a radial direction in which a plurality of spacer tools with uniform arc distance is adapted to be fixed in a direction toward the said engagement face. The cooperating wedge faces intersect the plane of the respective ring in intersection lines which converge in a direction toward the center of the ring. An embodiment in which the spacer tools are fixed axially, has a plurality of spacer tools disposed with a uniform arc distance and adapted to be fixed in a direction toward the bottom of the associated groove. The cooperating wedge faces intersect the plane of the associated ring in mutually parallel lines. This embodiment provides the advantage that the radially outwardly directed strong pressure exerted on the holding tool in the operation of the machine cannot propagate lengthwise in the groove to the adjacent tools and effect the positions of these.

The invention also concerns a method of making the tool ring described above, by forming one side face with a $\alpha$ groove which is co-axial with the axis of the ring and in which holding tools and spacer tools are alternately mounted. The groove is provided with guides for positioning of at least some of the spacer tools. At least the positioned spacer tools are fixed evenly so that the other tools are clamped uniformly in the groove because of cooperation between wedge faces on the tools. Usually, the guides for the positioned spacer tools cannot withstand the very great loads prevailing in the machine, but by means of the guides it is possible, through even clamping of the spacer tools, to fix these in an accurate position to a state where the tools support each other all the way round. When a relatively large number of spacer tools (as mentioned before not more than every second) is positioned, the other spacer tools are just to accommodate very small inaccuracies, so that the wedge angle of the cooperating faces can be made very small. Usually, the wedge angle may not be so small that the mutual friction between the tools prevent these from being loosened.

Finally, the invention concerns holding tools for use in the performance of the method described above. The tool has a plane underside and top side which is parallel with said underside and is formed with a track to receive an oblong blank. The track extends radially with respect to a pair of opposite, preferably mutually coaxial end faces which extend transversely to top side and the underside. A pair of opposite side faces form substantially uniform acute angles with a plane defined by the track and the axis common to the concentric end faces. Holding tools can have opposite side faces which form a right angle with a plane perpendicular to the common axis or opposite side faces which intersect a plane perpendicular to the common axis in lines which are parallel to the track so that the spacer tools are clamped radially or axially, respectively, in the tool ring.

Figure 2:
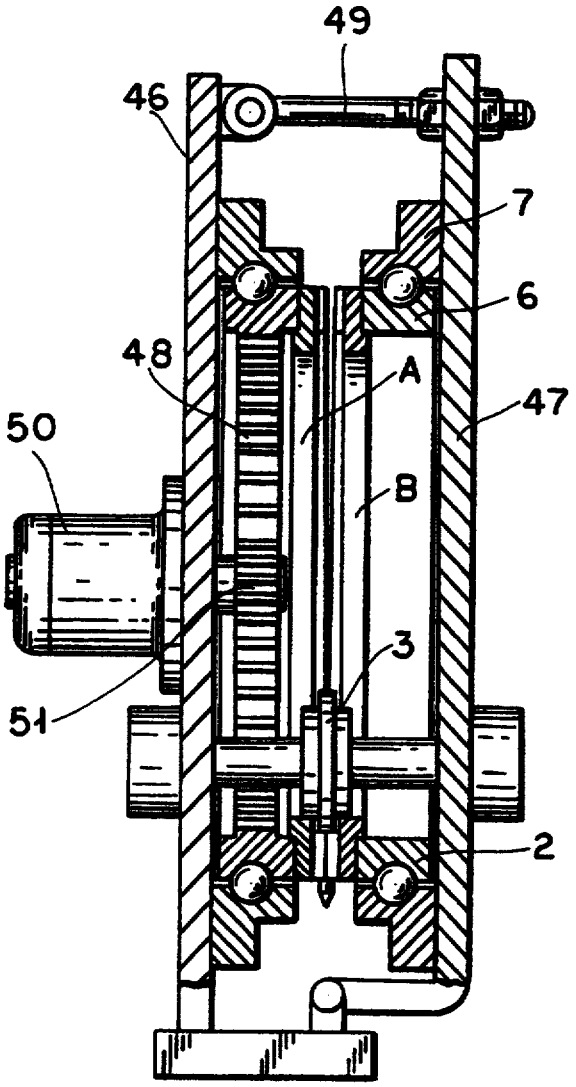
Figure 3:
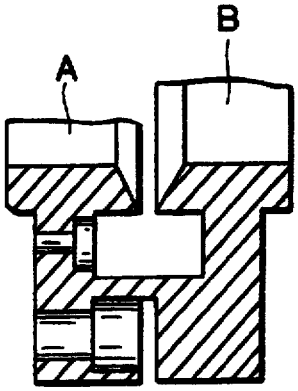
Figure 4:
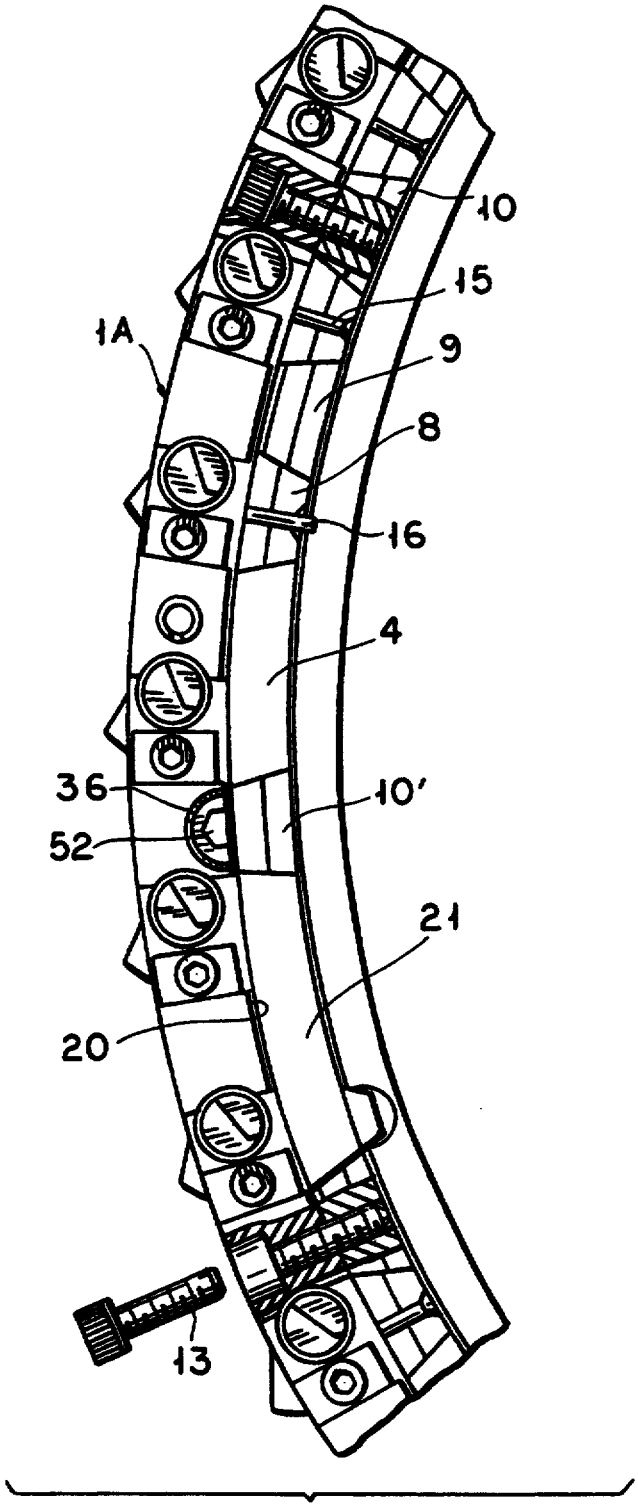
Figure 5:
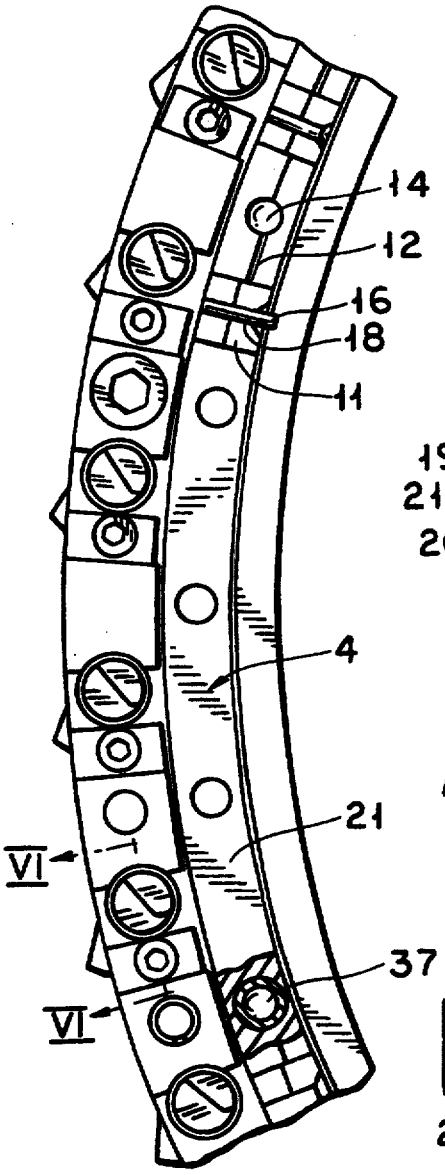
Figure 6:
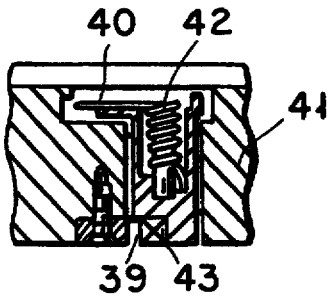
Figure 7:
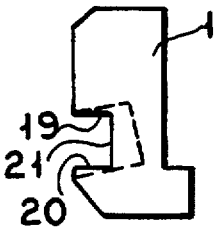
Figure 8A:
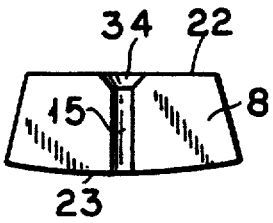
Figure 8B:
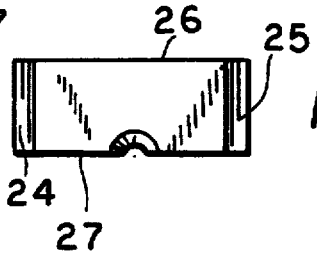
Figure 9A:
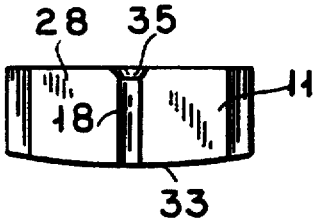
Figure 9B:
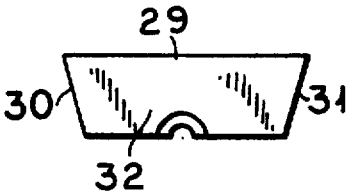

The invention will be explained more fully below by the following description of some embodiments with reference to the drawing, which FIG. 1 is a side view of a nail machine of a known type in which the tool ring of the invention is incorporated, FIG. 2 shows the nail machine in a vertical, transverse sectional view along the line II—II in FIG. 1, FIG. 3 shows two tool rings according to the invention and illustrates the mutual position of these, FIG. 4 is a partial view of a first embodiment of a tool ring according to the invention, FIG. 5 is a partial view of a second embodiment of a tool ring according to the invention, FIG. 6 is a sectional view along the line VI—VI in FIG. 5 of the locking devices provided in the tool ring for locking blanks, FIG. 7 is an axial section of the tool ring (B), FIG. [8] *8A* shows the holding tool according to the invention for the tool ring illustrated in FIG. 4, viewed along the upper side and *FIG. 8B shows the holding tool according to the invention for the tool ring illustrated in FIG. 4, viewed along* the concave end face, [respectively,] and FIG. [9] *9A* shows the holding tool according to the invention for the tool ring illustrated in FIG. 5, viewed along the upper side and *FIG. 9B shows the holding tool according to the invention for the tool ring illustrated in FIG. 5, viewed along* the concave end face[, respectively].

FIGS. 1 and 2 illustrate with which machine the embodiments described later are to be used. Such a machine is known from the Danish Patent Specification 143 935 and is characterized in that the blanks are worked by so-called internal rolling. It will be seen from FIG. 2, which shows a vertical cross-section through the nail machine from FIG. 1, how the tool rings 1 form part of the other constructional parts of the nail machine, and it appears that the machine is supported by two opposite plates 46 and 47, the plate 46 being stationarily secured to a given base, the plate 47 being pivotally mounted immediately opposite the first-mentioned plate. Each inner side of these plates mounts a bearing consisting of an inner ring 6 and an outer ring 7, where the outer rings are secured to the associated carrier plates, and the tool rings are secured to the inner rings 6 of the bearings, one of said inner rings, viz. the left ring in FIG. 2, being provided internally with a toothing 48 adapted to engage a gear wheel 51 mounted on the drive shaft of the motor 50.

The nail machine operates in a manner so that the motor drives the two opposite tool rings via the toothed inner ring such that two opposite holding tools indirectly engage each other opposite the working region when a blank is secured in the tracks provided in the two opposite holding tools. When a blank is thus present directly opposite the working region, its head is deformed corresponding to the mould cavity facing the centre of the tools, and then, after having gone through the internal rolling, the blank is released from the holding tools because of the mutually inclined positions of the rings.

A consideration of FIGS. 1 and 2 clearly reveals the importance of the new structure of the tool rings and tools, since it will be appreciated that the working principle of the machine requires very great accuracy in connection with the insertion of holding tools in the tool rings. As mentioned, this is because the employed manufacturing method, where the tools were mounted through a shrinkage process, is very exacting in terms of precision and is very expensive. For example, in case of inaccuracies with respect to differences in level in the rolling path plane (defined by holding tool faces directed toward the centre of the ring), it will be appreciated that tools placed too low cause insufficient working, and that the hard metal tools are damaged in case of tools placed too high; the latter situation is to be seen in combination with the great pressure tensions which occur via the continuous rolling contact between the roll and the tool rings.

Thus, it is of great importance that the rolling path formed by the holding tools has a completely uniform radial distance with respect to the roll. This is obtained in the present invention by a new construction of the tool ring and a new principle in connection with assembly and securing of associated holding tools.

It can be seen in FIG. 2 that the so-called A ring, which is the driven one, is disposed vertically, while the so-called B ring is inclined with respect to the A ring. According to the invention, the rings have a groove which is adapted for alternate insertion of holding tools and spacer tools.

This new principle involves two essential advantages. Firstly, in terms of production the groove is simple to make with very small narrow tolerances, which results in reduced manufacturing costs.

Secondly, a completely flexible tool assembly principle is obtained, which applies both in respect of adaption of the tool ring to other purposes, such as for another nail type or from nails to screws, etc., as well as in connection with wear, rupture and the like of the tools.

FIG. 4 is a partial view of a first embodiment of the tool ring of the invention. This ring constitutes one of the two rings cooperating in the nail machine, viz. the so-called A ring, which is the driven and vertically disposed one of these (this will be described later). It appears from FIG. 4 that the ring is formed with a groove 4 with axially disposed side faces 19 and 20, the bottom 21 of the groove being positioned in a plane in parallel with the plane of the ring. This groove is adapted to receive holding tools 8 and intermediate spacer tools 9, 10 and 10' along its entire extent, which likewise appears from FIG. 4.

FIG. 8 illustrates one of the tools 8 of the ring, and it appears that this tool has a plane underside 26 and a top side 27 parallel with the underside as well as two opposite faces 22 and 23 extending transversely with respect to the top side 27 and the underside 26, the radially outermost face 23 with respect to the ring being [co-axially] *convexly arc*-shaped, the other face 22 being plane and at right angles to the top side and the underside. Further, it appears that the two opposite side faces 24 and 25 of the tool form substantially uniform acute angles with an axial plane, which is defined by a track 15 provided in the top side 27 and the axis common with respect to the end faces 22 and 23. However, the face 22 may also be [co-axially] *convexly arc*-shaped.

It appears from FIG. 4 how some holding tools are placed, and it will be seen that, in this embodiment, through the bottom face 26 they engage the bottom 21 of the groove, and at the same time the radial convex end face 23 of the tool engages the radially outermost face 20 of the groove.

The track 15 in the holding tool moreover extends radially with respect to the two opposite end faces 22 and 23, and a mould cavity 34 is provided around the track in the [top side] *end face* of the tool. This track 15 is adapted to cooperate with an opposite holding tool in the opposite ring of the nail machine to secure a blank 16, while a roll adapted to the nail machine forms the head shape of the blank 16, which is defined by opposite mould cavities 34.

In this embodiment, every fifth of the mentioned spacer tools 9 is fixed radially outwardly with bolts 13 adapted for this purpose, so that the holding tools [10] *8* interposed between such secured spacer tools 10, and spacer tools 9 and 10 are pressed together and secured mutually because of the effect of the mutually cooperating wedge faces 24 and 25, and so that the convex end face 23 of the holding tools intimately engages the radially outermost side face 20 of the groove.

For correct positioning of the holding tools in the clamping of the fixed spacer tools 10, the groove is in this embodiment provided with guide bushings 36, which are axially fixed by the screws [51] *52* serving to fix the tool ring to the bearing ring 6 and disposed axially in the circumference of the ring, such that the bushings protrude beyond the tool 10' thus positioned. A radially fixed spacer tool is present between each such two positioned spacer tools.

This fixing method is to be seen in connection with mutually opposite wedge faces of the tools 8, 9, 10 and 10' since the inclination of the wedge faces with respect to the axial plane depends upon the number of interposed, non-positioned tools. It will therefore be appreciated that differences in the clamping of the spacer tools 10 can be compensated by means of the effect of the mentioned wedge faces through mutual displacement of the interposed holding and spacer tools. This principle moreover results in a certain reduction of the requirements made in respect of the manufacturing tolerances of the tools. To limit the displacement of the tools disposed in adjacent relationship on top of each other, every fifth spacer tool is thus fixed by the mentioned radially disposed bolt 13, and every fifth interposed spacer tool is positioned by means of the mentioned guide bushing 36 and axially disposed bolt [51] *52*, as the bolt 13 alone cannot position the spacer tool with sufficient accuracy.

FIG. 5 shows another embodiment of the invention. The illustrated tool ring is, like before, the so-called A ring, and the groove in this tool ring is formed in the same manner as in the embodiment described previously; it appears from the figure that all spacer tools in this embodiment are fixed in a direction toward the bottom of the groove.

This means that the holding and spacer tools are shaped differently with respect to the embodiment described previously, and FIG. 9 shows such a holding tool 11. It will be seen that, like the tool 8 in FIG. 4, the tool has a plane underside 29 and a top side 28 parallel with the underside as well as two opposite faces 32 and 33 transversely disposed with the top side 28 and the underside 29, the radially outermost face 33 with respect to the ring being [co-axially] *convexly arc-shaped*, the other face 32 being plane and at right angles to the top side and underside. The face 32, however, may alternatively be [formed] *convexly arc-shaped* co-axially with the face 23. The different structure of the holding tool, on the other hand, entails that, in this embodiment, the two opposite faces side 30 and 31 of the holding tool are so positioned as to perpendicularly intersect a plane defined by a track provided in the end face of the holding tool and the axis of the ring.

This structure of the holding tools 11 requires at the same time that also the interposed spacer tools 12, complementary with respect to the holding tools, are shaped differently. As appears from FIG. 5, each spacer tool is additionally fixed in this embodiment because the spacer tools are not "locked" against movement out of the groove, and accordingly all the spacer tools have to be fixed. FIG. 5 shows that the wedge face inclination of the tools has been reduced with respect to the embodiment in FIG. 4. This entails that the possible mutual displacement of the holding tools in the groove, as a function of the mutual clamping of the spacer tools, is reduced, so that a larger number of spacer tools is positioned. However, the wedge angle may not be too small, since it may occur that the tools, when readapted or exchanged, will tend to "get stuck", so that the frictional force, produced by the clamping of the tools, between the mutually cooperating wedge faces exceeds the resulting force directed axially upwardly with respect to the groove. Accordingly, all the spacer tools 12 are fixed in an axial direction as they are clamped down against the bottom face 21 of the groove 4 with a bolt 14 extending therethrough from the rear of the ring. Owing to the reduced possible displacement of the tools, as well as in connection with the relatively large tolerance fits for the bolts and the threaded holes, the positioning of every second one of the fixed spacer tools is established by means of guides 37, which are mounted in the bottom 21 of the groove 4 because of the amended structure of the holding and spacer tools, so that the guide pin ends, which extend axially upwards with respect to the bottom, are adapted to accurately engage mating holes in the spacer tools 12. However, it is evident that all spacer tools may not be positioned since the tools must be capable of being moved in the fixing process.

The embodiment shown in FIG. 5 moreover provides a particular advantage with respect to the embodiment of FIG. 4. It appears from the embodiment of FIG. 5 that the wedge-shaped side faces of the holding tools 11 intersect a plane, defined by the ring, in lines which are parallel with the track 18 provided in the surface 28 of the tool. It will thus be appreciated that radial pressure forces occurring in this embodiment between the roll 45 and in the rolling path formed by the holding tools 11 cannot be transferred to the other holding tools in the ring in the entire circumference of the ring 4. This is of great importance to the achievement of a uniform rolling path formed by the holding and spacer tools, on which path the said roll of the nail machine is to travel; thus, this results in uniform making of the heads of the retained blanks and reduces the probability of rupture in the holding tools and the roll in operation of the nail machine.

FIG. 6 shows a locking device provided in the tool rings (A rings) for both embodiments (see section [II—II] *VI—VI* in FIG. 5). This locking means serves to retain the blank 16 when it is inserted into the track 39 and until the deformation process for the blank has been completed. The device operates in that a guide plate 40, which is pivotally secured to a pin 41 and is biassed by the spring 42, is forced radially into the tool ring immediately before the blank is inserted, so that a locking eccentric 43, provided in a slidably journalled bushing, is pivoted to a non-locking position, following which a blank is inserted. The guide plate 40 is released immediately after this insertion of the blank, so that it moves into its locking position.

Thus, the blank 16 is retained for another arc segment and engages the holding tool in question of the mentioned A ring, the guide plate being again forced radially into the ring at a time immediately after the opposite cooperating holding tool, located in the B ring of said holding tool, is disposed so closely to the first-mentioned holding tools that the tracks 15 and 18, provided in both of these opposite holding tools for receiving a blank, receive and retain the blank, and then the roll [5] *3* (shown in FIG. 1) deforms the end of the blank protruding upwardly with respect to the rolling path 45, so that the blank is formed with a head which is defined by the mould cavity 34 or 35 of the holding tool 8 or 11.

It is illustrated in FIG. 3 how the two cooperating, mutually inclined tool rings (A and B ring, respectively) are placed. It appears that the A ring is completely vertical and is the ring driven by the motor 50. It will likewise be seen that the locking devices, disposed radially opposite the holding tools, are present in this A ring.

With respect to the B ring, its purpose is to serve as a so-called slave ring, where it is thus driven exclusively via the cooperation with the A ring around the working region, and it appears that the B ring is inclined, with respect to a vertical axis, in a predetermined angle of about 1° away from the adjoining A ring, which inclination causes an increasing mutual distance between the rings, in both peripheral directions away from the working region, the greatest distance being at a common, upper vertex of the rings diametrically opposite said working region. This mutual inclination of the rings is necessary in connection with feeding of blanks to the rings and thus the tools and discharge of these after working.

The relative location of the B ring entails that its groove is shaped as illustrated in broken lines in FIG. 7, the bottom of the groove forming an angle with the plane of the ring corresponding to the mutual angle between the two rings. This has the effect that the track axes for opposite holding tools, when these are disposed opposite the working region, will be parallel immediately before the rolling process.

I claim:

1. A tool ring for securing blanks in a machine of the type comprising a pair of rotating rings where opposite, plane side faces of the rings are formed with a plurality of holding tools so adapted that an oblong blank can be secured substantially radially between a pair of holding tools in respective ones of said rings, and where at least one ring has a groove adapted to receive the holding tools, said tool ring comprising:

spacer tools adapted to be fixed relative to the groove between the holding tools, each of said spacer tools and adjacent holding tools have cooperating wedge faces, one or more holding tools being secured between a pair of spacer tools, for forcing the holding tools into engagement with an engagement face of the groove, which face is disposed coaxially with the axis of the ring.

2. A tool ring according to claim 1, wherein planes of the opposite rings form a small angle with each other, the bottom of the groove in one ring being parallel with the plane of the ring, and the bottom of the groove in the other ring forms an angle with a radius in said ring corresponding to said angle between the ring planes.

3. A tool ring according to claim 1, wherein a plurality of spacer tools with uniform arc distance is adapted to be fixed in a direction toward the said engagement face, and said cooperating wedge faces intersect the plane of the respective ring in intersection lines which converge in a direction toward the center of the ring.

4. A tool ring according to claim 1, wherein a plurality of spacer tools disposed with a uniform arc distance is adapted to be fixed in a direction toward the bottom of the associated groove, and that said cooperating wedge faces intersect the plane of the associated ring in mutually parallel lines.

5. A method of making a tool ring according to claim 1, comprising forming one side face with a groove which is co-axial with the axis of the ring and in which holding tools and spacer tools are alternately mounted, and providing the groove with guides for positioning of at least some of the spacer tools, and fixing at the least the positioned spacer tools evenly so that the other tools are clamped uniformly in the groove because of the cooperation between wedge faces on the tools.

6. A method according to claim 5, comprising clamping the positioned tools radially outwardly.

7. A method according to claim 5, comprising clamping all the tools axially toward the bottom of the groove.

8. A holding tool for use in the performance of the method according to claim 5, wherein the tool has a plane underside and top side which is parallel with said underside and is formed with a track to receive an oblong blank, said track extending radially with respect to a pair of opposite, preferably mutually co-axial end faces which extend transversely to the top side and the underside, and a pair of opposite side faces forming substantially uniform acute angles with a plane defined by said track and the axis common to the concentric end faces.

9. A holding tool according to claim 8, wherein the opposite side faces form a right angle with a plane perpendicular to said common axis.

10. A holding tool according to claim 8, wherein the opposite side faces intersect a plane perpendicular to the said common axis in lines which are parallel with said track.

11. A tool ring according to claim 1, further comprising spacer tools adapted to be positioned relative to the groove without being fixed.

12. A tool ring according to claim 11, wherein all cooperating faces of the holding tools disposed between a pair of spacer tools are constructed as wedge faces cooperating in pairs.

13. A tool ring according to claim 1, wherein all cooperating faces of the holding tools disposed between a pair of spacer tools are constructed as wedge faces cooperating in pairs.

*14. A holding tool for use in a tool ring for securing blanks in a machine, of the type comprising a pair of rotating rings where opposite plane side faces of the rings are formed with a plurality of holding tools so adapted that an oblong blank can be secured substantially radially between a pair of holding tools in respective ones of said rings, and where at least one ring has a groove adapted to receive the holding tools* said holding tool having a plane underside and top side which is parallel with said underside and is formed with a track to receive the oblong blank, said track extending radially with respect to a pair of opposite end faces which extend transversely to the top side and the underside, and a pair of opposite side faces forming substantially uniform acute angles with a plane defined by said track and the axis common to the end faces, said side faces being oriented so as to act in wedging relationship relative to cooperating wedge faces of adjacent spacer tools arranged in an alternating manner with a plurality of said holding tools in the groove in the tool ring for forcing the holding tools into engagement with an engagement surface of said groove.

*15. A holding tool according to claim 14, wherein the opposite side faces form a right angle with a plane perpendicular to said common axis.*

*16. A holding tool according to claim 14, wherein the opposite side faces intersect a plane perpendicular to the said common axis in lines which are parallel with said track.*

*17. A holding tool for securing an oblong blank in a tool ring where opposite plane side faces of the ring contains a number of holding tools and spacer tools, said holding tools treating the blank by applying a force in the longitudinal direction of the blank, said holding tool having a plane underside and a top side which is parallel with said underside and formed with a track to receive the oblong blank and to retain it against the longitudinal force, said track extending radially with respect to a pair of opposite end faces which of at least one is convexly arc-shaped for transmitting said longitudinal force to a radially inwardly cylindrical supporting face of the tool ring for a number of holding tools, said end faces extending transversely to the top side and the underside, and said tool further comprising a pair of opposite side faces, the planes of the side faces intersecting each other in a line parallel with the axis of the arc-shaped end face and positioned between said axis and the holding tool.*

*18. A holding tool for securing an oblong blank in a tool ring where opposite plane side faces of the ring contains a number of holding tools and spacer tools, said holding tools treating the blank by applying a force in the longitudinal direction of the blank said holding tool having a plane underside and a top side which is parallel with said underside and formed with a track to receive the oblong blank and to retain it against the longitudinal force, said track extending radially with respect to a pair of opposite end faces of which at least one is convexly arc-shaped for transmitting said longitudinal force to a radially inwardly cylindrical supporting face of the tool ring for a number of holding tools, said end faces extending transversely to the top side and the underside, and said tool further comprising a pair of opposite side faces, the planes of the side faces intersecting each other in a line perpendicular to the axis of the arc-shaped end face and positioned above said top side.*

*19. A holding tool according to claim 17, wherein the opposite side faces form a right angle with a plane perpendicular to a common axis.*

*20. A holding tool according to claim 18, wherein the opposite side faces intersect a plane perpendicular to the a common axis in lines which are parallel with said track.*

* * * * *

UNITED STATES PATENT AND TRADEMARK OFFICE

CERTIFICATE OF CORRECTION

PATENT NO. : Re. 34,777
DATED : November 8, 1994
INVENTOR(S) : Ove Nielsen

It is certified that error appears in the above-indentified patent and that said Letters Patent is hereby corrected as shown below:

On title page, left column, item 30, "[NL] Netherlands" should be --[DK] Denmark--.

Signed and Sealed this

Fifteenth Day of August, 1995

*Attest:*

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : RE. 34,777

DATED : NOVEMBER 8, 1994

INVENTOR(S) : OVE NIELSEN

It is certified that error appears in the above-indentified patent and that said Letters Patent is hereby corrected as shown below:

Priority Data,
On the title page, left column, item [30] delete

"Apr. 24, 1986 [NL] Netherlands.....1881/86".

Signed and Sealed this

Thirtieth Day of July, 1996

*Attest:*

*Attesting Officer*

BRUCE LEHMAN

*Commissioner of Patents and Trademarks*